US008819788B2

(12) United States Patent
Shachar et al.

(10) Patent No.: US 8,819,788 B2
(45) Date of Patent: Aug. 26, 2014

(54) METHOD AND SYSTEM FOR PROVIDING SECURITY DATA TO SECURITY STATIONS

(75) Inventors: Yair Shachar, Ramat Gan (IL); Isac Winter, Givat Shmuel (IL); Andi Forsthofer, Even Yehuda (IL)

(73) Assignee: Clearone Communications Hong Kong, Limited, Salt Lake City, UT (US)

( * ) Notice: Subject to any disclaimer, the term of this patent is extended or adjusted under 35 U.S.C. 154(b) by 2185 days.

(21) Appl. No.: 10/689,000

(22) Filed: Oct. 21, 2003

(65) Prior Publication Data

US 2004/0088584 A1     May 6, 2004

Related U.S. Application Data

(60) Provisional application No. 60/419,593, filed on Oct. 21, 2002.

(51) Int. Cl.
| | |
|---|---|
| *G06F 7/04* | (2006.01) |
| *G06F 15/16* | (2006.01) |
| *G06F 12/14* | (2006.01) |
| *H04L 29/06* | (2006.01) |
| *G06F 21/00* | (2013.01) |
| *G06F 11/00* | (2006.01) |
| *G06F 21/31* | (2013.01) |
| *G06F 21/32* | (2013.01) |
| *G07C 9/00* | (2006.01) |
| *G05B 23/02* | (2006.01) |

(52) U.S. Cl.
CPC ............ *H04L 63/08* (2013.01); *H04L 63/0861* (2013.01); *G06F 21/31* (2013.01); *G06F 21/32* (2013.01); *H04L 63/0281* (2013.01); *H04L 63/0428* (2013.01); *H04L 63/1416* (2013.01); *G07C 9/0087* (2013.01); *G07C 9/00166* (2013.01); *G05B 23/02* (2013.01)
USPC ................... 726/5; 726/12; 726/22; 713/153; 713/182; 713/186; 702/188

(58) Field of Classification Search
CPC . H04L 63/08; H04L 63/0861; H04L 63/0281; H04L 63/0428; H04L 63/1416; G06F 21/31; G06F 21/32; G07C 9/00087; G07C 9/00166; G05B 23/02
USPC .............. 726/3, 5, 12, 22; 713/153, 182, 186; 702/188
See application file for complete search history.

(56) References Cited

U.S. PATENT DOCUMENTS

| | | |
|---|---|---|
| 6,111,517 A | 8/2000 | Atick et al. |
| 6,363,160 B1 | 3/2002 | Bradski et al. |
| 6,424,249 B1 | 7/2002 | Houvener |

(Continued)

*Primary Examiner* — Aravind Moorthy
(74) *Attorney, Agent, or Firm* — TraskBritt, P.C.

(57) ABSTRACT

There is provided a system and method of selectively directing collected security data that may be displayed concurrently at a first security station and at a supervisor station, and providing a communication link between such first security station and such supervisor station so that a supervisor may assist a security operator in the evaluation of the collected security data and in making a decision about such collected data.

There is further provided a system and method of determining the height of a part of a body by capturing an image of such part with a camera at a known height and known distance from such body, computing an angle of a horizontal line from a lens of such camera and a line from such camera to such part of such body, and calculating the distance between the height of such camera and the height of such part of such body.

37 Claims, 3 Drawing Sheets

(56) References Cited

U.S. PATENT DOCUMENTS

| | | |
|---|---|---|
| 6,538,649 B2 | 3/2003 | Bradski et al. |
| 6,618,074 B1 | 9/2003 | Seeley et al. |
| 7,015,945 B1 * | 3/2006 | Sullivan ......................... 348/150 |
| 2002/0052719 A1 * | 5/2002 | Alexander et al. ............ 702/188 |
| 2002/0116403 A1 * | 8/2002 | Weedon ........................ 707/201 |
| 2003/0023592 A1 * | 1/2003 | Modica et al. ..................... 707/6 |
| 2003/0025599 A1 * | 2/2003 | Monroe ......................... 340/531 |
| 2003/0056113 A1 * | 3/2003 | Korosec ......................... 713/200 |
| 2003/0058084 A1 * | 3/2003 | O'Hara ......................... 340/5.53 |
| 2003/0071724 A1 * | 4/2003 | D'Amico ....................... 340/506 |
| 2003/0215218 A1 * | 11/2003 | Chang ............................. 386/96 |
| 2004/0004542 A1 * | 1/2004 | Faulkner et al. ............... 340/506 |

* cited by examiner

METHOD AND SYSTEM FOR PROVIDING SECURITY DATA TO SECURITY STATIONS

The present application claims benefit from prior provisional patent application Ser. No. 60/419,593 filed on 21 Oct. 2002 and entitled "SECURITY CHECKPOINT METHOD AND SYSTEM", incorporated herein by reference in its entirety.

FIELD OF THE INVENTION

The present invention relates generally to security systems and to providing collected security data to security checkpoints.

BACKGROUND OF TIE INVENTION

Security stations or security checkpoints, such as for example those that may be used to screen passengers or baggage at airports, or those that restrict entrance into sensitive areas such as military bases or power facilities, may include equipment or instruments that collect, process and display security data. Such security data may be for example x-ray images of baggage, identification images, documentary data, video data of persons requesting access to a facility (e.g., airline passengers), personal data (e.g., passport numbers, names, descriptions, driver's license or other identification card data), itinerary data, biometric data such as fingerprints, height, weight or other security data. Security data may be collected, viewed or evaluated by an operator of a security station or checkpoint, or for example may be compared with stored data such as identification pictures on file or other stored data. A security station operator, such as for example a baggage x-ray machine operator or passport clearance booth operator may be responsible for evaluating collected data and determining whether to clear the subject through the checkpoint or to take some other action. In some situations, if a security station operator encounters a suspicious item or situation, or is otherwise uncertain as to a decision or action to be taken, the operator may summon a colleague, assistant or supervisor to assist in evaluating the collected data, the suspicious item or the potential entrant. A supervisor may for example and in response to a request of an operator, walk over to the security station and review the collected data, such as for example an identification document, badge, passport or x-ray image, or such as for example a biometric reading such as for example an iris scan, voiceprint, handprint, face recognition data or other identification or verification data. A supervisor may assist the operator in evaluating the collected data, and in determining whether to clear an item or potential entrant through a security checkpoint.

Existing systems may facilitate communication between a security station and a supervisor station concerning collected security data. Some existing systems may pen-nit viewing of collected security data at a supervisor or central command station. Such viewing may include for example viewing closed circuit images collected by remote cameras or viewing biometric data transmitted as reports or signals to a supervisor station. Existing systems may facilitate a limited control of remote data collection mechanisms such as controlling an image angle or zoom of a remote camera, or controlling a remote lock mechanism of a remote door or entryway.

BRIEF DESCRIPTION OF THE DRAWINGS

The invention is herein described, by way of example only, with reference to the accompanying drawings, in which like components are designated by like reference numerals, wherein.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 1:
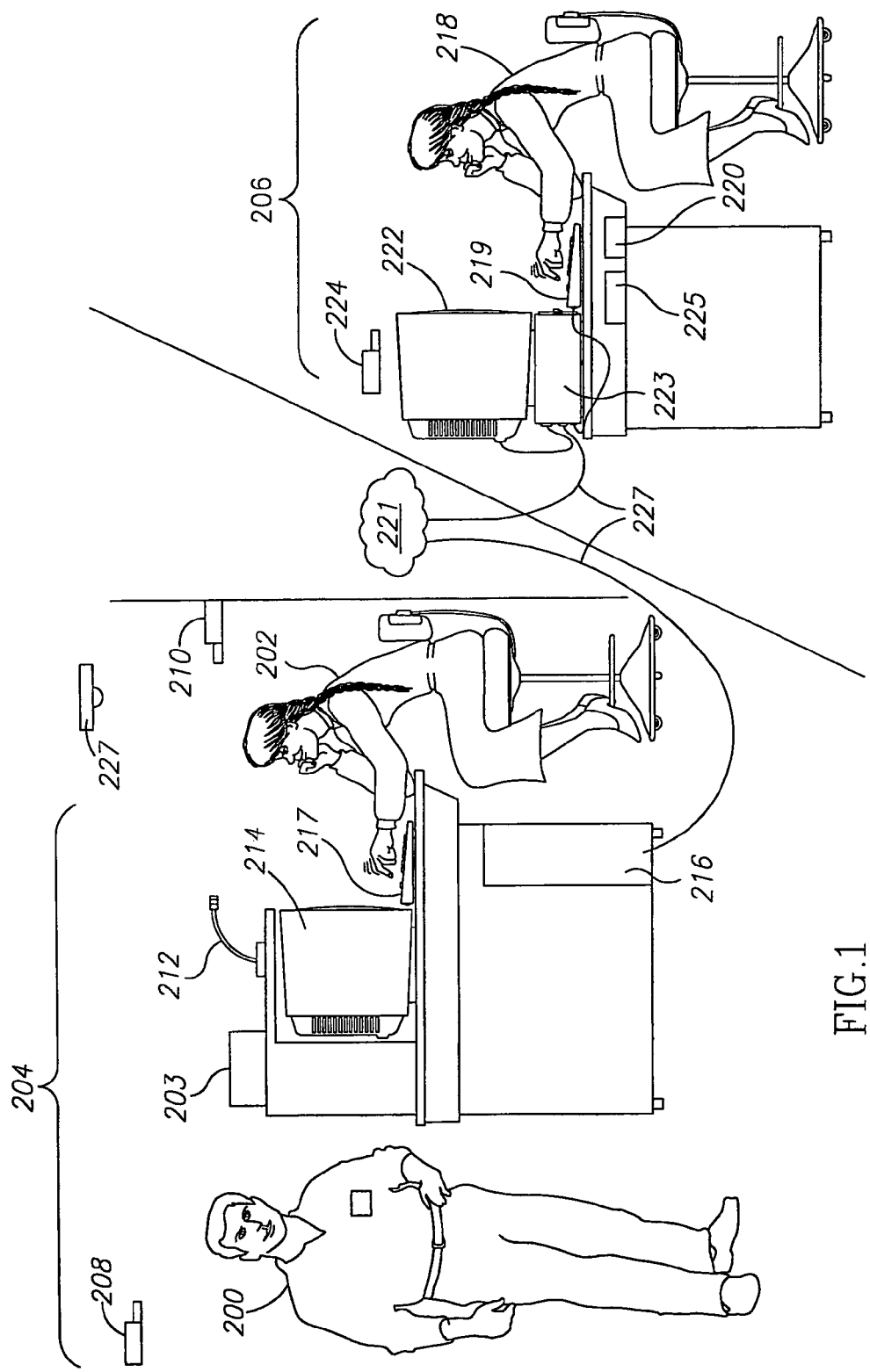
FIG. 1 is a drawing of certain components of a security station and a supervisor station in accordance with an exemplary embodiment of the invention.

Reference is made to FIG. 1 depicting certain components of a security station and a supervisor station in accordance with an exemplary embodiment of the invention. Security station 204 may for example be or include a passport clearance booth in for example an airport or other location where security evaluations are made by an operator or by a mechanism. Other security stations 204 may be used in conjunction with embodiments of the invention, for example, airline ticket counters, guards or screeners at checkpoints at, for example, power stations, office buildings, etc., or other suitable security stations. Security station 204 may in some embodiments be manned by an attendant or operator such as for example a security operator 202. Security station 204 may in some embodiments be equipped with or include one or more security data collection units 210 such as for example a camera, a baggage X-ray machine, a passport or other identity card reader, a biometric sensor or other instrument for collecting security data on a subject 200, and a security data collection unit controller 217, such as a keyboard, mouse, joystick or other control mechanism that may allow a security operator 202 to control a security data collection unit 210 or enter security data. Security station 204 may also include a viewing unit 214, such as for example a monitor, screen or other data display medium upon which may be displayed for example security data that may have been collected by a security data collection unit 210 or by some other mechanism, or that may display for example data that may have been stored in data filing system. Security station 204 may also include a communication device 212 such as for example a telephone, intercom, teleconference device or system, videoconference device or system or combination of any of the foregoing, that may facilitate communication between security operator 202 or security station 204 on the one hand, and supervisor station 206 or supervisor 218 on the other hand. Security station 204 may also include one or more controllers 216 that may for example select, transfer, transmit or relay collected security data to for example a supervisor station 206. In some embodiments, security station 204 may include one or more additional cameras 208 that may capture still or moving images or data such as sound or video streams of operator 202, or of other items in security station 204. For example, camera 208 or data collection unit 210 may capture facial expressions of persons waiting to pass through a security station 204 or other checkpoint, and in some embodiments, supervisor may be able to see such expression. Security station 204 may include other items and may be configured in other ways.

Supervisor station 206 may be attended by a security supervisor 218. Supervisor station 206 may include a viewing unit 222 such as for example a computer screen or other information display medium, a communication device 220 such as for example a telephone, intercom, teleconference, videoconference or other device that may be suitable for communication, or in some embodiments for transferring data, between a security station 204 and supervisor station 206. In some embodiments, such videoconference may be opened over a link that is based on for example an ITU.H323 protocol; other protocols or communication methods may be used. In some embodiments, supervisor station 206 may include or be equipped with an image capture system, video imager or other device such as for example a camera 224 by which for example still or video images of supervisor 218 or of other items may be collected for broadcast or transmission to security operator 202 or to another supervisor 218. In some embodiments, supervisor station 206 may include a data processor such as for example a computer 223 and a supervisor data collection unit controller 219 or supervisor data entry device, such as for example a key-board, joystick, power-switch or other controller or data entry device which may in some embodiments be connected to computer 223 and which may be suitable for remotely controlling some or all of the functions of equipment in security station 204 used for security data collection such as for example, data collection unit 210. Other methods for control by a supervisor 218 of a data collection unit 210 or for a supervisor's 218 collection of security data concerning a subject 200 are possible. In some embodiments, security data collection unit controller 217 may be operably connected to viewing unit 214. In some embodiments, supervisor data collection unit controller 219 may be operably connected to computer 223, to network 221 by wires 227 or by wireless link or to viewing unit 222. In some embodiments supervisor data collection unit controller 219, computer 223 and viewing unit 222 may be connected directly or indirectly to one another or to network 221. Other items may be included in a supervisor station 206, and a supervisor station 206 may have other configurations.

In an exemplary embodiment of the invention, a security operator 202 who may be located for example at a security station 204 may view or collect security data such as for example an identification badge or identification photo that may have been presented to such security operator 202 for example by a subject 200. In other embodiments, for example an x-ray image of an item may be collected by an x-ray machine or other data collection unit 210 at for example a security station 204 or another location. Other suitable data may be collected by various methods. For example, biometric data, image data, identification data, etc. In some situations, a security operator 202 may desire assistance of a supervisor 218 as a result of certain security situations or other situations. For example, a comparison by a security operator 202 of a presented photo ID and a file picture summoned by security operator 202 onto, for example a viewing unit 204 may cause security operator to desire assistance or advice. In other instances, security procedures may require the involvement of additional personnel if certain situations, such as for example a particular data profile of a person being screened, occur. Security operator 202 may by way of for example controller 216 or another device, signal that he desires to consult with a supervisor 218 about such collected security data. Security operator 202 may select a supervisor 218 with whom he may desire to consult or to whom he may otherwise wish to transmit some or all of the collected security data. A device, method or algorithm as may in some embodiments be included in or connected to controller 216, may in some embodiments select the supervisor 218 to whom collected data is to be directed.

Collected data such as for example, an x-ray image or a picture or copy of an identification photo or a file picture summoned by security operator 202 may be directed or otherwise transmitted to a selected supervisor 218 at a supervisor station 206. Other suitable data may be transmitted. Security operator 202 may in some embodiments communicate with supervisor 218, for example to explain his uncertainty or to otherwise request assistance. Supervisor station 206 and security station 204 may have concurrent access to collected security data. Supervisor 218 may view the collected security data on for example viewing unit 222 and may communicate with security operator 202 by way of for example communication device 220 or another communication link to discuss or give advice for example about the collected security data. In some embodiments, controller 216 may facilitate the transfer or transmission to supervisor station 206 of images or data so that supervisor 218 may view an image of subject 200, of collected security data, of security operator 202 or other items as such images or other data may be collected by for example camera 208 or by security data collection unit 210 or by other equipment. Controller 216 may for example select portions of collected data for transfer, may cause transfer or certain data, or may cause certain data to be collected.

In some embodiments, security operator 202 and/or subject 200 may view images of supervisor 218 as may have been captured by camera 224 or by another image capture device. In some embodiments, supervisor 218 may use for example supervisor data collection unit controller 219 to remotely control some or all of the functions of a data collection unit 210 such as a camera, such that a supervisor 218 may for example zoom, tilt or pan a view of subject 200 or of another remotely located item, or otherwise control a data collection unit 210. In some embodiments, supervisor 218 may by way of for example a supervisor data collection unit controller 219, control one or more biometric sensors 203, such as for example a voice print scanner, finger print collector, face recognition unit or other biometric sensors.

In some embodiments, a signal by a security operator 202 of a desire to consult with or seek assistance from a supervisor 218, or to transmit collected security data to a supervisor 218 may be given by for example, calling such supervisor on a telephone (including for example, a telecommunication device that is part of security station 204), by clicking a help button on a screen or by signaling on some other suitable device that is available to security operator 202.

In some embodiments, security station 204 may not be limited to a single physical location. For example, one or more of the items included in a security station 204 may be located remotely from other of such items. For example, a data collection unit 210 may include one or more sensors such as a camera that is located remotely from a security operator 202. For example, a security operator 202 may monitor numerous cameras, sensors or data collection units 210 in remote areas such as for example in a coverage area of a building, campus or for example on numerous platforms of a transit system. In some embodiments security station 202 may not be identified with any single physical location, such that elements of security station 204 may be dispersed in various locations. Other configurations of security stations 204 are possible.

In some embodiments, security operator 202 may be a person. In other embodiments, security operator 202 may be a device, system or mechanism capable of monitoring or evaluating security data collected by one or more data collection units 210.

In some embodiments, a supervisor station 206 may be or include a physical location where a person may monitor or evaluate collected data. In other embodiments a supervisor station 206 may not be limited to a single physical location, such that one or more of the items included in a supervisor station 206 may be located remotely from other of such items. In some embodiments, a supervisor 218 may be or include for example a device, data base, system or mechanism capable of monitoring or evaluating security data collected by one or more data collection units 210 or data that is referred to such supervisor station 206 by security stations 204. In some embodiments, supervisor station 206 may be or include more than one supervisor station 206 such that for example collected security data may be transferred or transmitted to more than one supervisor station 206 in for example a hierarchy or set of levels of expertise or authority of supervisors 218 who may for example operate such supervisor stations 206. For example, security operator 202 may refer or transmit collected security data to a supervisor 218 in for example a supervisor station 206. Such supervisor 218 may in turn refer information or collected security data to another supervisor 218 such as for example a police, intelligence or other law enforcement official. In some embodiments, a supervisor 218 may be a colleague, subordinate or unrelated party to an operator 202.

Supervisor station 206 may have a capacity to communicate with, assist or collect security information from one or more security stations 204 simultaneously. Supervisor station 206 may have a capacity to communicate with or direct collected security data to more than one other supervisor station 206 simultaneously.

In some embodiments, supervisor station 206 may be located proximate to security station 204, such as for example in the same room or building. In some embodiments, supervisor station 206 may be located remote from security station 204, such as for example in a different building or city.

In an exemplary embodiment, supervisor 218 may be capable of selecting a video, audio or data channel upon which to observe collected security data on for example viewing unit 222. In some embodiments, a recording device 225 may record some or all of the collected security data transmitted to supervisor 218. Recording device 225 may in some embodiments be or include a computer storage device such as a hard drive or disc drive. In some embodiments recording device may be or include an audio, video or other recording tape or other medium.

In some embodiments, a security station may include or monitor a fire detector 227 or for example a heat detector mounted on a fire fighter, while a supervisor station 206 may be or include a fire control central command station. A supervisor 218 in such a fire control central command station may collect security data such as heat or smoke detection data from a smoke detector or heat detector mounted in a building or for example on a firefighter. A firefighter may for example select a supervisor station 206 and transmit data to such station. A supervisor 218 may receive such data, communicate with a firefighter to for example direct such firefighter away from for example a fire source, and for example control or direct other data collection units or emergency response measures such as sprinklers. In yet another embodiment, the security data collection unit 210 may contain an infra red sensor for fire detection. In case where a possible outbreak of fire is recognized by the security station 204, a communication link may be opened between the security station 204 and a supervisor station 206. The supervisor 218 may receive for example, a live video stream, which may help in the assessment of the current situation. Other applications, data collection methods and sensor control methods are possible.

In some embodiments, security data collection unit 210 may be or include a still or video camera that may collect, capture, display or transmit images. In other embodiments security data collection unit 210 may be another sensor such as for example an x-ray machine or metal detector, a heat or motion detector, a biometric sensor such as a finger print sensor, palm print sensor, iris scanner, voice, face or other biometric sensor, an identification card or passport reader, or other suitable sensor as may be used to evaluate or identify a person, item or situation for security purposes. Other sensors or security data collection units 210 are possible. In some embodiments, security collection unit 210 may be or include one or more cameras that may for example calculate the height of a person or of a feature of a person, such as for example the eyes of a person, and such height may be used as a biometric parameter that may be used to verify a person. Security data may be input by, for example, hand data entry processes; for example an security operator 202 typing responses to questions posed to a subject 200.

In some embodiments viewing unit 214 may be or include one or more display screens such as for example those typically used as a computer monitor. In other embodiments, viewing unit 214 may be or include a map, chart, table or other display board upon which may be displayed collected security data or warnings that may be issued in response to collected security data. In some embodiments, viewing unit 214 may be one or more indicator lights, sounds or other signals as may be produced by for example a metal detector such as for example a hand-held metal detector or fire detector 227. In still other embodiments, viewing unit 214 may be or include a print out of one or more physical characteristics of a person or object such as for example weight, height, scent, color or other condition or criteria as may be detected by a data collection unit 210.

In some embodiments security data collection unit controller 217 may be a device or mechanism that controls one or more aspects or functions of a security data collection unit 210. In some embodiments, such device or mechanism may be or include a controller for altering a directional, zoom, tilt, focus, contrast, exposure or other control parameter of for example a camera. Other security data collection unit controllers 217 are possible. In some embodiments such security data collection unit controller 217 may be or include for example a speed, direction, intensity, sensitivity or other parameter on for example a baggage x-ray machine or conveyor belt.

In some embodiments a supervisor data collection unit controller 219 may control items other than or in addition to the particular security data collection unit 210 that collected the security data that was transmitted to a supervisor station 206. For example, security data may in some embodiments have been collected by an x-ray machine, while a supervisor data collection unit controller 219 may control among other things a camera 208 that may be used for viewing a subject 200. In some embodiments, supervisor data collection unit controller 219 may be or include for example a key-board, joy stick, touch screen or other control device. In some embodiments, supervisor data collection unit controller 219 may be or include for example a mechanical, electrical or other device that may control a security data collection unit 210. In some embodiments a supervisor 218 may be in sole control of a security data collection unit 210 by way of a supervisor data collection unit controller 219. In other embodiments, an operator 202 and a supervisor 218 may jointly or alternatingly control security data collection unit 210 by way of a security data collection unit controller 217 or supervisor data collection unit controller 219.

Communication device 212 may in some embodiments be or include a uni-directional or bi-directional communication link such as a telephone, teleconference, videoconference, data transfer or other voice, image or data communication device. In some embodiments communication device 212 may facilitate communication between security operator 202 and a supervisor 218. In some embodiments, communication device 212 may facilitate communication between security operator 202, a supervisor 218 and a subject 200. In some embodiments, communication device 212 or one or more other devices or communication links may facilitate some or all of uni-directional voice, video and/or data transmission, or some or all of bi-directional voice, video and/or data transmission between a security station 204 and one or more supervisor stations 206.

A subject 200 may be for example a person or item seeking entry or passage into or through a security checkpoint such as for example an airline gate. In other embodiments, a subject 200 may be a condition such as for example a disturbance such as for example a tripped alarm in a secure area or a smoke or fire condition in a monitored area.

In some embodiments, controller 216 may be or include one or more switches that may for example direct or facilitate the transfer, relay, distribution or broadcast of collected security data to a supervisor station 206 or to a viewing unit 222 of the supervisor station 206 that was selected for such transfer. In some embodiments, controller 216 may be or be included in an electronic device such as for example a computer or computer network. In some embodiments, controller 216 may be under the control in part or in whole of security operator 202 who may for example press a help button or issue a call signal to request assistance of for example a supervisor 218, and direct controller 216 to transmit collected security data to the selected supervisor station 206.

In some embodiments, controller 216 or some other device may be or include a mechanism, algorithm or instruction that selects a supervisor station 206 to which collected security data is to be transmitted, on the basis of pre-defined criteria. In some embodiments, such pre-defined criteria may be or include for example a severity of a security condition such as for example the identification of a notorious criminal attempting to pass a security checkpoint. In some embodiments, such pre-defined criteria may be or include for example, the availability of a supervisor 218 from a pool of supervisors 218, a particular level of expertise or authority of a supervisor 218 or other operator of a supervisor station 206 that may be relevant to the collected security data that is to be transmitted, or the particular location of a supervisor 218 or supervisor station 206 as may be near an operator 202 or security station 204. In some embodiments, controller 216 or another processor that may be operably connected to security data collection unit 216 may process or analyze collected security data. In some embodiments, controller 216, alone or with another processor may take some pre-defined action based on an analysis of collected security data such as for example, selecting a supervisor station 206 to which collected security data may be directed, directing collected security data to a selected supervisor station 206 or opening a communication link between security station 204 and supervisor station 206. Other actions are possible.

In some embodiments, collected security data may be transmitted over a network 221 such as for example a local area network, the Internet or other IP network, a telephone or cellular network or other electronic network. In some embodiments, communication between a security station 204 and a supervisor station 206 may be facilitated over a network 221 such as for example an Internet Protocol (IP) based network, a phone network, a local area network or a cellular network. Other networks are possible.

In some embodiments, operator 202 or supervisor 218 may indicate and transmit data as part of a graphic, text or other overlay on collected security data. For example, an operator 202 may mark, or add an indication or highlight to a particular object that may appear for example on an x-ray image that is transmitted to supervisor 218. Such marking or graphical overlay may be added using for example a touch screen, cursor or other highlighter on for example a screen of a viewing unit 214. In some embodiments such graphic overlay may be transmitted to an operator 202 or supervisor 218 along with or separately from collected security data.

Figure 2:
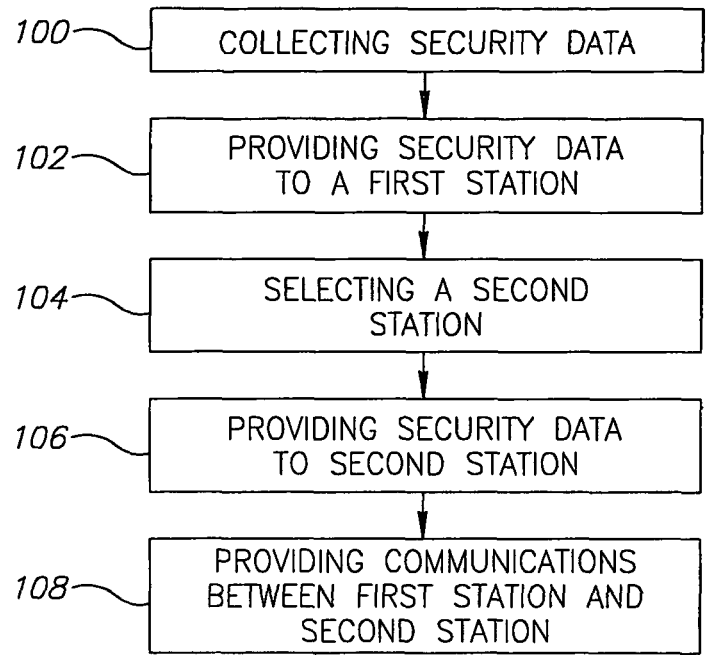
FIG. 2 is a flow chart depicting certain operations to selectively provide security data to a supervisor station in accordance with an embodiment of the invention.

Reference is made to FIG. 2, a flow chart depicting certain operations to selectively provide or transmit security data to a supervisor station in accordance with an embodiment of the invention. In block 100, security data may be collected about for example an item, person, condition or other security situation. Such security data may be collected by an individual (e.g, by asking questions, by operating equipment, etc.), by a device, by a sensor or otherwise or may be called upon from a data base or storage system. Collected security data may be derived from a combination of inputs such as for example an image of an individual collected from for example a camera, and an image of a person collected from a data base.

In block 102, collected security data may be provided to a security station 204. Such provision may be performed through the recording and/or transmission of data, images, visual or audible signals or by other methods. Such provision may be made over an electronic network, such as for example a computer or other electronic network such as an IP based network. In some embodiments the collecting of security data and the providing of such security data to a security station 204 may be accomplished in a single operation such as for example the receipt of a passport or documentary data by an operator of a security station 204. In other embodiments, collecting security data and providing it to a security station 204 may be accomplished in two or more operations.

In block 104, a second station may be selected. In some embodiments such selection may be made by for example security operator 202 of a security station 204. In some embodiments, such selection may be made by or in conjunction with a controller 216 or an automated system that may evaluate pre-defined criteria as a basis for such selection. Such pre-defined criteria may include for example, the availability, expertise, proximity or other factors attributable to such second station or otherwise relevant to the evaluation of the security data. Such selection need not occur, for example, in the case where two stations are connected for a certain period of time or across a number of security interactions, for example during a training period of a security operator 202. In addition to its ordinary meaning, the term 'selection' as used herein may also mean for example, picking one supervisor 218 from a group of supervisors or for example, picking a supervisor 218 from only one supervisor 218.

In block 106, security data may be provided to a second station. Such provision may be made for example by way of one or more switches or controllers 216 that may transmit collected data or other data to a second station. In some embodiments such data may be provided to such second station so that the first station and the second station have concurrent access to the collected security data. In some embodiments, the second station may be able to control the collection of more data about a subject of such collected data. For example, in some embodiments, a supervisor 218 at a second station may control a camera located for example at a first station or under the control of a security operator 202 in order to capture additional images of a subject 200. An operator at the second station may, for example, query a subject at the first station using audible questions, or may transmit such questions to an operator at a first station.

In block 108, a communication link may be opened between a first station and a second station. In some embodiments, such communication link may be provided through, for example, a telephone, teleconference, videoconference or data transfer device. In some embodiments such communication link may facilitate consultation between for example a security operator 202 at a first station and for example a supervisor 218 at a second station, such that such security operator 202 and supervisor 218 may consult about the collected security data. In some embodiments, a communication link may facilitate concurrent communication among a security operator 202 of a security station 204, a supervisor 218 of a supervisor station 206 and a subject of collected security data. For example, a security operator 202 may use an intercom or speaker phone to facilitate a conversation where subject 200, supervisor 218 and security operator 202 can speak, hear and be heard.

Figure 4:
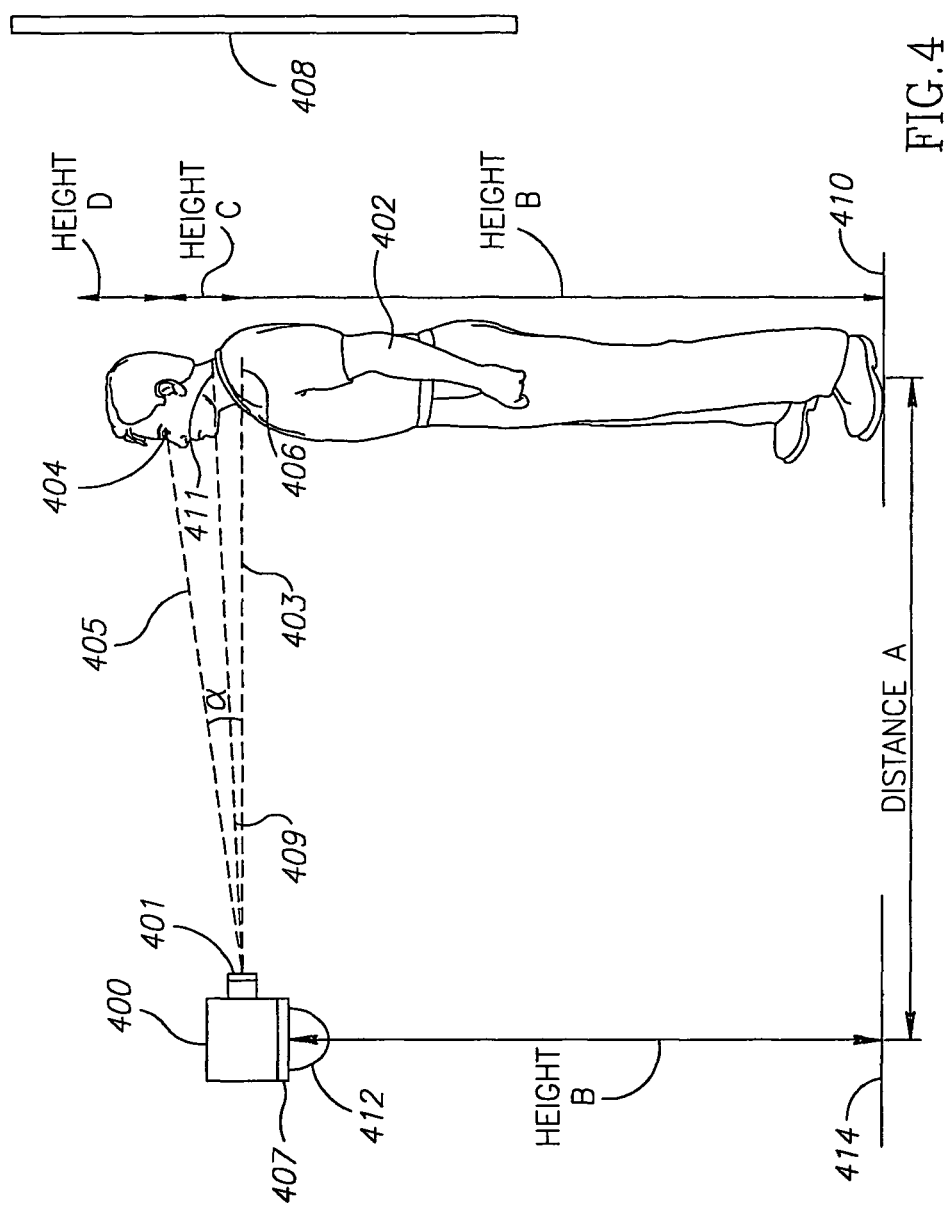
FIG. 4 is a schematic drawing of certain equipment that may be used in calculating the height of a person's eyes based upon an image of such person in accordance with an embodiment of the invention.

In certain embodiments, a measurement that may be used for example as part of an identification or verification of an individual or object at for example a security station may be for example a height of a person's eyes or the height of some other visible organ, feature or part of a person or an object. In some embodiments, such measured height may be compared to a known height of such organ or feature on a particular individual. Such a measurement may be converted into another biometric parameter such as for example the height of a person. Reference is made to FIG. 4, a schematic drawing of a system that may be used in calculating the height of a person's eyes based upon an image of such person in accordance with an embodiment of the invention. As shown in FIG. 4, a camera 400 may be placed at a fixed or designated height from a floor or other horizontal surface 414, such height may be designated for example as height B. An individual 402 may stand or be positioned at a fixed or calculable distance from camera 400, such distance may be designated as for example distance A. An imaginary horizontal line 403 may be designated from the center of lens 401 (or the approximate center of the camera 400, or some other suitable point) at height B to a point 406 on individual 402. An imaginary eye line 405 may be designated from the center of lens 401 to the eyes 404 of individual 402. The angle between horizontal line 403 and eye line 405 may be designated as angle alpha. In some embodiments tangent of angle alpha times distance A may yield height C, as the height between the top of height B and the height of eyes 404 of individual 402. In some embodiments, height B may be added to height C to yield the height of eyes 404. The height of eyes 404 may serve for example as a biometric parameter to confirm or verify an individual 402 against known eye height of such individual, or for other security or identification purposes. In other embodiments, a calculation or estimation may be made of the distance between the height of eyes 404 and the top of the head of individual 402 as may be designated height D. The sum of height C and height D may be added to height B to yield a total height of individual 402. Such total height may be for example compared to a known height of individual 402 on for example a passport, and such comparison may be used for identification, security or other purposes. Other comparisons may be made and other uses for height measurements in accordance with an embodiment of the invention may be implemented. Other suitable combinations of components may be used with embodiments of the present invention, and other specific measurements may be used. For example, other body functions may be used for a height measurement.

In some embodiments, camera 400 may be or include components capable of panning, tilting and zooming (e.g., PTZ) an image to be captured by camera 400. In some embodiments, camera 400 may include or be connected to a processor 407, or a controller or computer that may be capable of for example locating or distinguishing a face or other features that is included in an image captured by camera 400, or of locating and distinguishing eyes 404 or other features in an image captured by camera 400. In some embodiments, processor 407 may be part of or included in camera 400. In some embodiments, processor 407 may be included in a computer or other calculating machine that is separate from camera 400. In some embodiments, the operations required to provide an estimate of a height of a body feature or of a subject may be carried out by a suitable processor, such as processor 407, or another suitable processor or computing system.

In some embodiments, camera 400 by itself, with processor 407 or in combination with other components, may acquire a view of a face of individual 402 such that such face is within an image captured by camera 400. Camera 400 or processor 407 may qualify the image of a face of individual 402 to ascertain that the face is properly acquired. In one preferred embodiment, the term "properly acquired" means that the face borders are fully contained within the captured image and that the focus, intensity, contrast and saturation attributes of the image enable proper computerized segmentation of face part, or of a suitable other image or feature analysis process, within the image. Other embodiments may have other criteria for proper acquisition. If the face is not properly acquired a further attempt or attempts to capture and qualify a face as properly acquired may be take place. If the image is qualified by for example camera 400 or for example a processor 407 as a face and is considered as properly acquired, an attempt may be made by for example processor 407 to find eyes 402 within such image.

In some embodiments, the location or distinguishing by camera 400 or by some other component of eyes 404 or another body feature within an image may be designated by reference to one or more pixels that may be part of such image. For example, for an image captured by camera 400 that includes a matrix of 1000×1000 pixels, the location of eyes 404 found within such image may have been found for example at pixel 563 on a horizontal x axis of such image and for example on pixel 624 on a vertical y axis of such image. In some embodiments, location or position of eyes 404 within an image may be found without reference to pixels or may be found or designated using other coordinates or methods. For example, operations used to calculate the height or position of bodily features may use units such as real world distance units (e.g., centimeters, inches, etc.) angles or percentages, etc.

In some embodiments, the determination of the height of eyes 404 along a vertical y axis within an image may be of more significance than the location of eyes 404 along a horizontal x axis. In some embodiments the location of eyes 404 within an image may be deemed the average value of the location along a vertical y axis or other axis of the two eyes 404. In other embodiments the location of a single eye 404 may be deemed the location of both eyes 404 in an image.

Other methods of calculating or designating the location of eyes 404 in an image may be used.

In some embodiments, the calculation of angle alpha as the angle between eye line 405 and horizontal line 403, may include or be based on for example a calculation of the number of angle degrees per a given number of pixels of a known position on a vertical y axis. For example, if horizontal line 403 is level with y axis pixel 300, and eye line 405 reaches for example pixel 450 along a y axis, then angle alpha may be determined based on the number of degrees of angle alpha deemed to be included in the 150 pixels between horizontal line 402 and eye line 405.

In some embodiments, the number of degrees of angle alpha per a given number of pixels of a known location along a vertical y axis may depend on one or more factors including for example the focal distance or zoom setting of camera 400 that was in use when a particular image was captured. In some embodiments, camera 400 may have numerous possible zoom settings that may effect the enlargement or diminution of an image in focus. In some embodiments, camera 400 may have 1,000 or more zoom settings. Other numbers of zoom settings are possible. In some embodiments, a determination may be made as to the number of pixels that are included in an image of an object of a known height at a known distance from camera 400. From such determination it may be possible to determine for each zoom setting the number of degrees of angle alpha per a given number of pixels of a known location along a vertical y axis within an image captured by camera 400. For example, a calibration process may be undertaken for camera 400 where for each zoom setting, an image is captured of an object of known or measurable placement and orientation relative to camera 400. Such object may for example be a poster or chart 408 affixed to for example a wall at a known placement and orientation relative to camera 400. Such chart may display for example a series of horizontal color bars of known thickness or height. Such color bars may be for example a series of bars of alternating colors such as red/blue/green/red/blue/green bars, each of which may be for example 5 cm thick. Other objects may be used in place of a chart 408, and displays on such chart 408 may be other than color bars or may use other colors or indications of height.

As part of a calibration process of camera 400, for each zoom setting of camera 400, a determination of the pixel position of characteristic bar points, such as color bar edges within an image of for example chart 408 may be made using known computer vision methods such as for example edge detection. The focal distance of the camera lens may be calculated using at least two distinct points of the color bars included in an image of for example chart 408 which have been located and identified. Similarly, angular resolution may be calculated. For each zoom step, the focal distance of camera 400 may be calculated. In this way, the focal distance and possibly the angular resolution for each zoom step may be stored in a table and used for example to calculate the number of degrees of angle alpha per pixel at a particular zoom step. In some embodiments, a calibration process such as that described above may not be required if for example, a camera 400 provides direct and reliable focal distance readings.

In some embodiments, a camera 400 may be tilted to capture an image of a face or eyes 404 or some other object. In some cameras 400, the angle or other measure of such tilt may be indicated on a read out of such camera 400 or as a measurement on a gauge that may be part of a stand to which camera 400 may be affixed. Other methods of calculating tilt of a camera 400 are possible. In some embodiments, angle alpha may be added to, or subtracted from or otherwise adjusted to account for the tilt setting 412 of camera 400 before calculating a height C based on such angle. For example, if camera 400 is tilted up at a measure of 15 degrees, the straight line of site 409 from lens 401 to individual 402 may correspond for example to an imaginary line that intersects individual 402 at a point 411 that is higher than the point 406 intersected by horizontal line 403. The degree of tilt of camera 400 may in some embodiments be added to the number of degrees of angle alpha as part of for example the trigonometric calculation to determine height C that may be added to height B to yield for example the height of eyes 404 of individual 402.

In some embodiments a measurement of the distance A between camera 400 and individual 402 may be calculated for example by requiring individual 402 to stand straight on a given point 410 on a floor. In some embodiments, distance A may be indicated by a read out on camera 400 as part of a focus calculation read out as such may be a feature of camera 400. In some embodiments a range detecter such as for example a laser range detector may be used to calculate distance A. Other methods of calculating distance A may be used.

In some embodiments, measurements may be made of the height of objects or organs other than eyes 404 and other than on people. For example, in some embodiments the invention may be used to measure the height of animals, plants or trees or inanimate objects.

Figure 3:
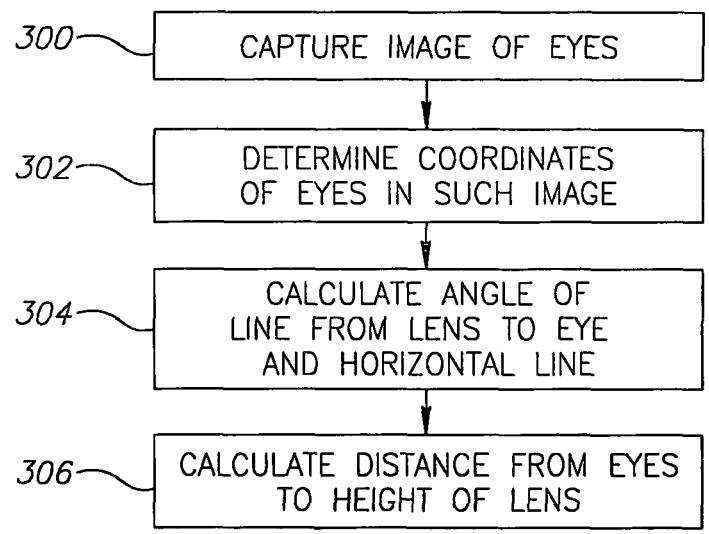
FIG. 3 is a flow chart depicting certain operations in calculating the height of an object using an image of such object in accordance with an embodiment of the invention.

Reference is made to FIG. 3, a flow chart depicting certain operations in calculating the height of an object using an image of such object in accordance with an embodiment of the invention. In block 300, an image of eyes 404 may be captured or distinguished by for example a camera 400. Other body features may be imaged. Typically, the image includes at least a body feature to be keyed in on, and in addition may include surrounding features (e.g., a face, torso, etc.) In block 302, a determination may be made of the vertical coordinates of eyes 404 within such image. Such coordinates may in some embodiments be designated as corresponding to the pixels along a vertical y axis in an image that are occupied by eyes 404. The vertical coordinates may be for example a part of the features—for example, the center of one of the eyes 404, the average coordinates of the center of the eyes 404 or an edge of a feature, etc. In block 304, an angle of an imaginary line from lens 401 to the coordinates of eyes 404 on an image may be calculated against a horizontal line 403 or straight line of site 409 from such lens 401. In block 306, a trigonometric calculation may be performed to calculate the distance or height of eyes 404 from an imaginary horizontal line 403 or straight line of site 409 from lens 401. Other steps or series of steps may be used.

In some embodiments, camera 400 may be mounted at a fixed height such as height B. In some embodiments, the height of camera 400 may be varied by a user or automatically, and such varied height may be known or recorded as part of for example the calculation of height C or the height of individual 402.

It will be appreciated by persons skilled in the art that embodiments of the invention are not limited by what has been particularly shown and described hereinabove. Rather the scope of at least one embodiment of the invention is defined by the claims below

We claim:
1. A method, comprising:
collecting security data from a security data collection unit;
providing the security data to a first security station having a first operator at the first security station monitoring the security data;

selecting at least a second security station from among a plurality of second security stations based on pre-defined criteria, the selected second security station having a second operator at the second security station for providing supervisory assistance to the first operator responsive to a consultation request from the first operator;

providing the security data to the second security station so that the first security station and the second security station have concurrent access to the security data; and opening a bidirectional communication link between the first security station and the second security station, wherein the bidirectional communication facilitates communication between the first operator of the first security station and the second operator of the second security station.

2. The method of claim 1, wherein the providing the security data to the second security station comprises transmitting the security data over an electronic network.

3. The method of claim 1, further comprising using a controller operably connected to the first security station to direct the security data to the second security station.

4. The method of claim 1, wherein the predefined criteria includes the availability of the second operator at the second security station.

5. The method of claim 1, wherein the predefined criteria comprises an expertise of the second operator of the second security station in comparison to an expertise of operators of other second security stations of the plurality of second security stations.

6. The method of claim 1, wherein providing the bidirectional communication link between the at least first security station and the second security station comprises providing a graphical overlay on images in the collected security data.

7. The method of claim 1, further comprising controlling the security data collection unit from the second security station.

8. The method of claim 7, wherein controlling the security data collection unit comprises controlling at least one biometric sensor from the second security station.

9. The method of claim 1, wherein collecting security data from a security data collection unit comprises collecting security data from a baggage x-ray machine operated by an individual.

10. The method of claim 1, wherein collecting security data comprises from a security data collection unit collecting security data from a biometric sensor operated by an individual.

11. The method of claim 1, wherein collecting security data from a security data collection unit comprises collecting fire detection data from a sensor.

12. The method of claim 1, wherein opening the bidirectional communication link includes opening a communication link over an electronic network.

13. The method of claim 1, wherein providing the security data to the second security station, comprises providing the security data to the second security station over an electronic network using an internet protocol.

14. The method of claim 1, wherein opening the bidirectional communication link between the first security station and the second security station, comprises opening a videoconference link between the first security station and the second security station.

15. The method of claim 14, wherein opening the videoconference link comprises opening a videoconferencing link that is based on an ITU.F323 protocol.

16. The method of claim 1, wherein selecting at least a second security station comprises selecting the second security station located remotely from the first security station.

17. The method of claim 1, wherein collecting security data from a security data collection unit comprises controlling the security data collection unit with the first security station.

18. The method of claim 1, wherein the opening the bidirectional communication link between the first security station and the second security station, comprises opening a bi-directional data transfer link.

19. The method of claim 1, wherein collecting security data from a security data collection unit comprises calculating a height of a feature of a subject from an image of the subject.

20. A security system having supervisory assistance capabilities, comprising:

a security data collection unit;

a first viewing unit operably coupled to the security data collection unit, and configured to display collected security data to a first operator stationed at the first viewing unit;

a second viewing unit to display the collected security data concurrently with the display on the first viewing unit to a second operator stationed at the second viewing unit as a supervisor to the first operator; and a controller operably coupled to the security data collection unit and the second viewing unit, the controller configured to selectively direct collected security data to the second viewing unit from among a plurality of different second viewing units on the basis of pre-defined criteria, the security data being directed over a bidirectional communication link facilitating communication between the operators stationed at the first viewing unit and the second viewing unit for monitoring the collected security data responsive to a consultation request for supervisory assistance from the second operator.

21. The security system of claim 20, wherein the controller selectively directs the collected security data to the second viewing unit responsive to a consultation signal initiated by the operator stationed at the first viewing unit.

22. The security system of claim 20, wherein the bidirectional communication link is over an electronic network.

23. The security system of claim 22, wherein the electronic network is an internet protocol based network.

24. The security system of claim 20, wherein the bidirectional communication link is a videoconference link.

25. The security system of claim 24, wherein the videoconference link is based on a ITU.H323 protocol.

26. The security system of claim 20, wherein the first viewing unit is located remotely from the second viewing unit.

27. The security system of claim 20, wherein the security data collection unit comprises at least a fire detection sensor.

28. The security system of claim 20, wherein the security data collection unit comprises a baggage x-ray machine.

29. The security system of claim 20, further comprising a security data collection unit controller operably connected to the second viewing unit.

30. The security system of claim 20, wherein the predefined criteria comprises an availability of the operator stationed at the second viewing unit.

31. The security system of claim 20, wherein the predefined criteria comprises an expertise of the operator stationed at the second viewing unit in comparison to an expertise of operators of other second viewing units of the plurality of different second viewing units.

32. The security system of claim 20, comprising a communication unit enabling the operator stationed at the second viewing unit to communicate with a subject of the collected security data.

33. The security system of claim 20, wherein the collected security data includes data added by the operator stationed at the first viewing unit.

34. The security system of claim 20, comprising a first security data collection unit controller operably connected to the first viewing unit, and a second security data collection unit operably connected to the second viewing unit.

35. The security system of claim 34, wherein the first security data collection unit controller is configured to control a biometric sensor.

36. The security system of claim 34, wherein the second security data collection unit controller is configured to control a biometric sensor.

37. The security system of claim 20, wherein the security data collection unit includes a camera operably connected to a processor configured to a height of feature of a subject based on an image of the subject.

\* \* \* \* \*